United States Patent [19]

Wright

[11] Patent Number: 4,677,597

[45] Date of Patent: Jun. 30, 1987

[54] METHOD FOR ENHANCING COMMON DEPTH POINT SEISMIC DATA

[75] Inventor: James H. Wright, Tulsa, Okla.

[73] Assignee: Standard Oil Company, Chicago, Ill.

[21] Appl. No.: 711,347

[22] Filed: Mar. 13, 1985

[51] Int. Cl.$^4$ ............................ G01V 1/34; G01V 1/36
[52] U.S. Cl. ........................................ 367/47; 367/59; 367/74; 364/421
[58] Field of Search ........................ 367/38, 40, 43, 53, 367/56, 47, 59, 74, 68; 364/421

[56] References Cited

U.S. PATENT DOCUMENTS

| | | | |
|---|---|---|---|
| 4,316,267 | 2/1982 | Ostrander | 367/68 |
| 4,316,268 | 2/1982 | Ostrander | 367/68 |
| 4,554,649 | 11/1986 | Herkenhoff et al. | 367/68 |
| 4,570,246 | 2/1986 | Herkenhoff et al. | 367/68 |
| 4,573,148 | 2/1986 | Herkenhoff et al. | 367/47 |

FOREIGN PATENT DOCUMENTS 8309286  10/1984  United Kingdom .

OTHER PUBLICATIONS

O. E. Naess, "Single-Trace Processing Using Iterative CDP-Stacking" Geophysical Prospecting, 1982, 641-652.

Primary Examiner—Thomas H. Tarcza
Assistant Examiner—Daniel T. Pihulic
Attorney, Agent, or Firm—Stanley Timothy D.

[57] ABSTRACT

A method for processing and displaying seismic data. More particularly, a novel method for enhancing the display of common depth point seismic data. Common Depth point gathers of seismic data are processed to enhance the signal-to-noise ratio by reducing the averaging effects of lateral variations in the subterranean formation on the seismic data as well as reducing the averaging of range dependent amplitude variations in the seismic data.

5 Claims, 9 Drawing Figures

METHOD FOR ENHANCING COMMON DEPTH POINT SEISMIC DATA

BACKGROUND OF THE INVENTION

The present invention generally relates to a method for processing and displaying seismic data.

It is conventional in seismic prospecting to place a plurality of seismic receivers along the earth's surface at spaced locations. A plurality of seismic sources disposed at spaced locations along the same line are then activated to produce seismic energy waves which spread out in all directions. Vibrating devices and explosive devices are common examples of such seismic sources. The seismic waves generated by the seismic source are reflected, refracted and defracted from subsurface interfaces in the earth, and some of these diverted waves are detected by the seismic receivers. The seismic receiver produces an electrical signal which can be processed to form a seismic signal. The seismic signals are displayed as seismic sections which contain information about the time, duration and intensity of the seismic wave. The seismic data displayed in such seismic sections can be studied to extrapolate information regarding the type and location of subsurface formations producing the received waves. This information in turn is employed to evaluate the subsurface formations for the oil and gas bearing properties.

Because of the geometry involved, seismic waves reflected from a common reflecting point can be received by a first seismic receiver from energy emitted by a first seismic source and also by a second seismic receiver from energy emitted by a second seismic source. These phenomena are employed in developing common depth point (CDP) seismic data. Because of the redundancy of the information obtained in this technique, seismic signals may be combined or averaged so that a high signal-to-noise ratio is obtainable. In common practice, from 3 to 48 sourcedetector pairs of seismic signals form a "gather" of CDP seismic signals. A plurality of CDP gathers can then be combined to form a seismic section.

The common depth point technique for processing and displaying seismic data is widely employed. The CDP method obtains multiple coverage of common subterranean reflection points. In CDP processing of seismic data, seismic signals representative of seismic energy having a common reflection point but which have penetrated the earth's subterranean formation along widely different ray paths and have different offset distances, are summed or stacked. Prior to summing or stacking, the seismic signals are first processed using the normal-move out technique to compensate for the different seismic energy ray paths and offset distances.

The CDP method enhances reflection events in the seismic signals which correspond to the assumed ray path and reduces other events. Enhanced reflection events in the seismic signal can then be plotted as a plurality of traces to form a seismic section which is a mapping of the reflectivity characteristics of the earth's subterranean formations. Additionally, random background noise developed in each seismic signal can be reduced by summing together the various seismic signals having a common reflection point.

Due to general inhomogeneities of the earth's subterranean formations, the CDP processing technique tends to mask or average lateral variations in the earth's subterranean formations encountered by the seismic wave traveling along different ray paths to a common reflection point. The CDP processing technique also tends to mask or average range dependent amplitude variations of the reflected signals. Attempts to compensate or ameliorate these masking or averaging effects have been proposed by others such as 0. E. Naess "Single-Trace Processing Using Iterative CDP-Stacking," *Geophysical Prospecting* 30, pages 641-652 (1982). Naess suggests that only the near traces of a CDP gather of seismic signals need be subjected to an iterative processing technique to produce a normal incident seismic section. Naess' iterative seismic section is in all respects an average of the near traces of CDP gather of seismic signals. The other traces in the CDP gather of seismic signals do not contribute to the final result except in determining which amplitudes on the original near traces of the CDP gather of seismic signals should be kept and which should be reduced, and then how much these should be reduced. As such, the primary information to be derived from Naess' iterative near trace seismic section was already present on the original near trace of CDP gather of seismic signals before the iterations were run. The iterations only effect a reduction in the noise of the original near traces of the CDP gather of seismic signals.

In a way this is what one attempts to achieve in conventional CDP stacking. One tries to convert all the traces of a CDP gather of seismic signals into near traces (i.e. zero offset seismic signals) through the expedient of normal move out corrections. That is, a stacking velocity is assumed for the propagating seismic wave so that common reflecting point events tend to align along a straight line rather than along a hyperbolic curve. Thereafter, all traces in the CDP gather of seismic signals are treated as equal and summed together. Unfortunately, all traces in a CDP gather of seismic signals are not equal since they result from encountering different subterranean formations due to the difference in the seismic wave ray paths combined with the general inhomogeneity of the earth. The difference in conventional CDP processing from that of Naess' is that Naess' iterative near trace seismic section treats the balance of the traces in a CDP gather of seismic signals merely as an aid in processing the near traces of a CDP gather of seismic signals, while in conventional CDP processing all the traces in a gather of seismic signals are treated as if they were actually near trace seismic signals.

That lateral variations in the earth's subterranean formations can have interpretive significance has been demonstrated by Ostrander in U.S. Pat. Nos. 4,316,267 and 4,316,268.

SUMMARY OF THE INVENTION

The present invention relates generally to a method of processing and displaying seismic data. More particularly, a novel method for enhancing common depth point (CPD) gathers of seismic signals having an improved signal-to-noise ratio in a seismic section is provided as well as a method for reducing the averaging of range dependent amplitude variations of the traces in CDP gathers of seismic signals and for reducing the masking of the effects of lateral variations in the earth's subterranean formations.

The method for processing and displaying seismic data of the present invention includes forming CDP gathers of seismic signals and obtaining a measure of amplitude for each seismic signal in a CDP gather of seismic signals for a selected time slice. The measure of the amplitudes of each seismic signal for a selected time slice in the CDP gather is then curve fitted to a function of incident angle of the seismic signal for a common reflection point in the earth's subterranean formations. A measure of the curve fitted function for selected incident angles can then be displayed as a selectable incident angle seismic section.

It is further understood that by iteration, additional measures of the curve fitted function of the incident angle, for a selected incident angle, can be obtained for all time selections in the CDP gather of seismic signals. Selectable incident angle seismic sections can be obtained from the measures of the curve fitted function of incident angle for the selected incident angle for all time selections of all CDP gathers of the seismic signals.

DESCRIPTION OF THE PREFERRED EMBODIMENT

The present invention is related to a method for processing and displaying seismic data. More particularly, a novel method for enhancing common depth point gathers of seismic data and for reducing the effects of lateral variations in the earth's subterranean formations in the displayed seismic sections as well as reducing the effects of range dependent amplitude variations in the traces of a CDP gather of seismic signals. Selectable incident angle and selectable range seismic sections having an increased seismic signal-to-noise ratio can be obtained from the seismic data so enhanced.

The CDP technique for processing and displaying seismic data is widely used to effect a reduction in the random noise included in seismic signals representative of reflected/refracted seismic energy. Typical of multifold seismic exploration techniques, a plurality of seismic sources $S_i$ and seismic receivers $R_j$ are spaced about an exploration region of interest. Seismic signals $T_{ij}$ are developed at each seismic receiver $R_j$ in response to seismic energy being imparted into the earth's subterranean formations by sources $S_i$. In the CDP technique, gathers of seismic signals having a common reflection point are collected to provide multiple sets of information regarding the common reflection point.

Conventional CDP processing of such gathers of seismic signals $T_{ij}$ first requires transforming each of the seismic signals $T_{ij}$ into zero offset or normal incident seismic signals using normal moveout corrections, i.e., giving each seismic signal $T_{ij}$ the appearance of being normally incident to the common reflection point.

Figure 1:
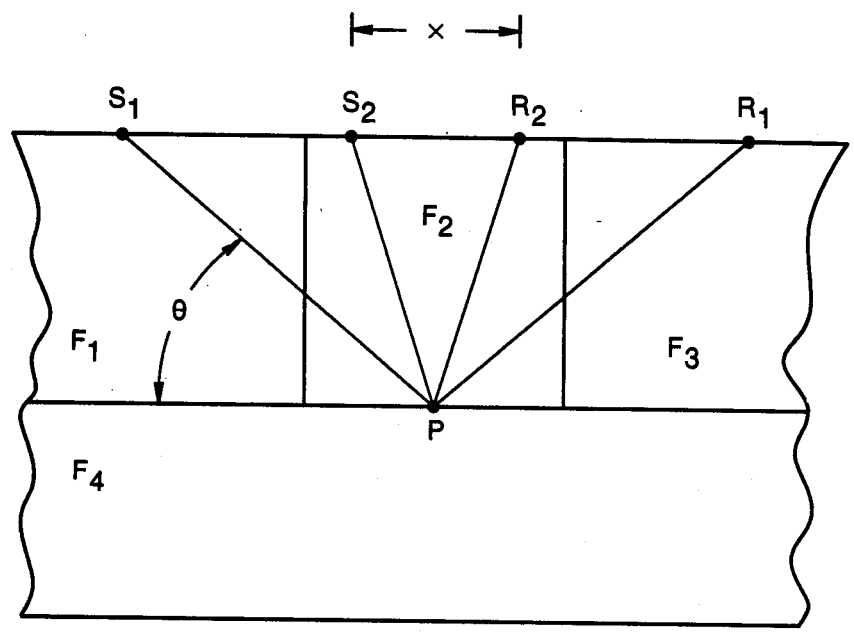
FIG. 1 is a cross-sectional representation of various subterranean formations including the CDP method of seismic data collection.

Looking now to FIG. 1, a representation of a cross-section of the earth's subterranean formations, it can be seen that seismic energy imparted into the earth by source $S_2$ and received by seismic receiver $R_2$ produces the seismic signal $T_{22}$ and travels exclusively through subterranean formation $F_2$. Seismic signal $T_{11}$ is developed by seismic receiver $R_1$ from seismic energy imparted by source $S_1$. The seismic energy detected by receiver $R_1$ travels through subterranean formations $F_1$, $F_2$, and $F_3$, and yet both seismic signals $T_{11}$ and $T_{22}$ have the common reflection point P. As such, seismic signal $T_{11}$ contains information about lateral variations in the earth's subterranean formation not contained in seismic signal $T_{22}$. Information about the lateral variations in the earth's subterranean formations above formation $F_4$, contained in seismic signal $T_{11}$, tends to be smeared or averaged in conventional CDP processing of the seismic signals $T_{11}$ and $T_{22}$.

Figure 2:
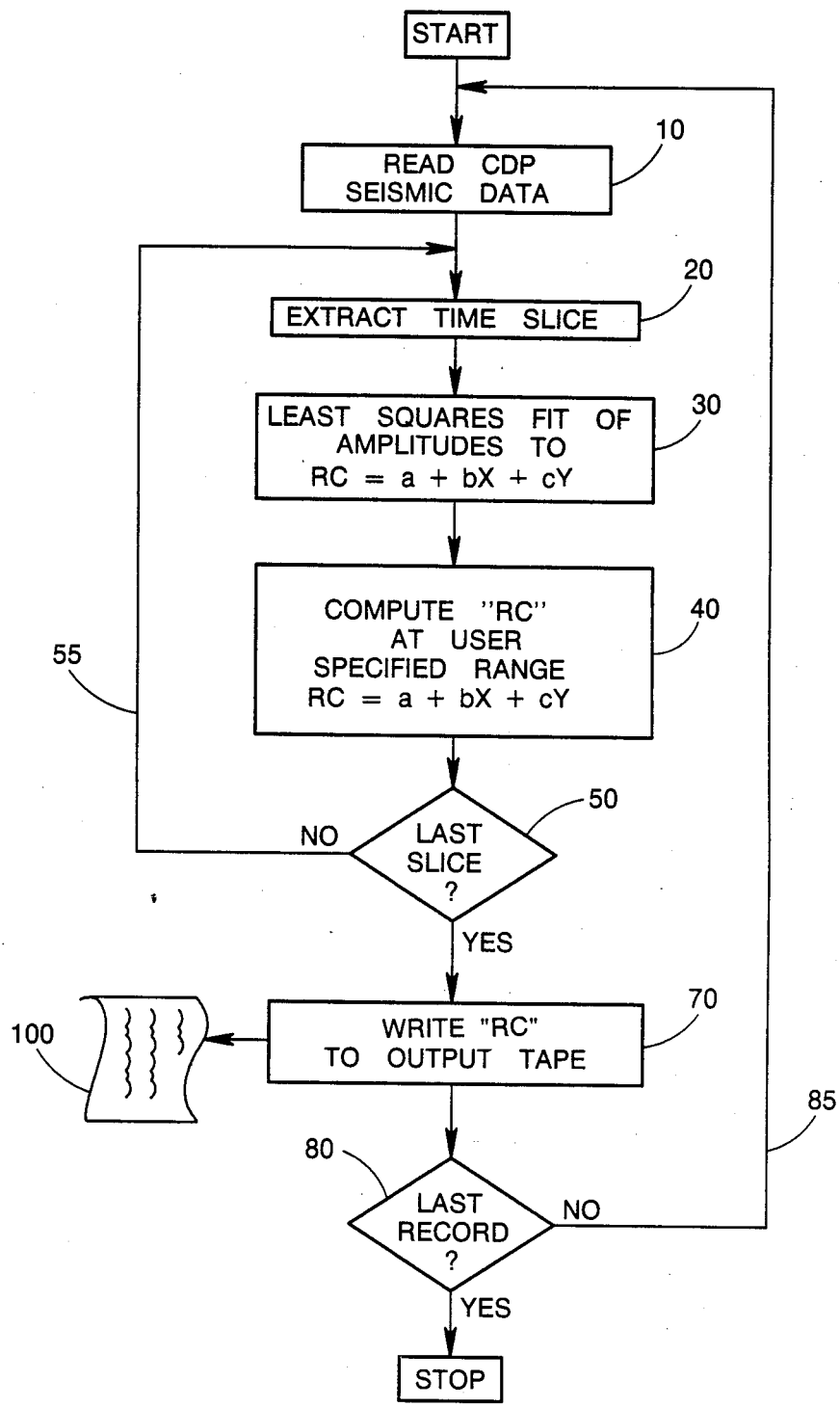
FIG. 2 is a flow diagram of the process of the present invention.

A method of processing and displaying seismic data in accordance with the present invention is represented in the process diagram of FIG. 2. Multifold seismic data is recorded from a plurality of seismic receivers for a plurality of seismic source initiations. Having obtained multifold seismic data, CDP gathers of seismic signals preprocessed for normal-moveout correction are read from the recorded seismic data at 10. Amplitudes $A_{ij}$ of each seismic signal $T_{ij}$ in a first CDP gather of seismic signals are obtained for a first horizontal time slice $t_1$ at 20. The values of the seismic signal amplitudes $A_{ij}$ are then curve fitted at 30 to a reflection coefficient function RC which is dependent upon the incident angle $\theta$ or range x such as:

$$RC = a + b X + c Y \quad (1)$$

Here X and Y can be intermediate functions of either the incident angle $\theta$ or the range x. The coefficients a, b and c are curve fitting parameters which can be obtained through standard curve-fitting techniques such as least squares.

For selected values of incident angle $\theta$ or range x the reflection coefficient RC can be obtained at 40. Entering decision block 50, a decision is made as to whether or not the end of the seismic signal $T_{ij}$ has been reached and if not by way of line 55 the process returns to block 20 indexed to the next time slice $t_1+i$. This iteration is continued until the end of the seismic signal $T_{ij}$ is reached. The values of the reflection coefficient RC over the entire length of the seismic signal $T_{ij}$ are outputted to memory 70.

Proceeding to decision block 80, a determination is made whether or not all of the CDP gathers of seismic signals in the recorded seismic data have been processed, if not, by way of iterative loop 85 the next CDP gather of seismic signals is processed until the last CDP gather of seismic signals has been processed. At such time, the plurality of reflection coefficients RC stored at 70 can be outputted and displayed as selectable incident angle or selectable range seismic sections 100 having enhanced signal-to-noise ratio and which ameliorate the effect of averaging lateral variations in the earth's subterranean formations and the effect of averaging range dependent amplitude variations in a CDP gather of seismic signals.

Figure 3A:
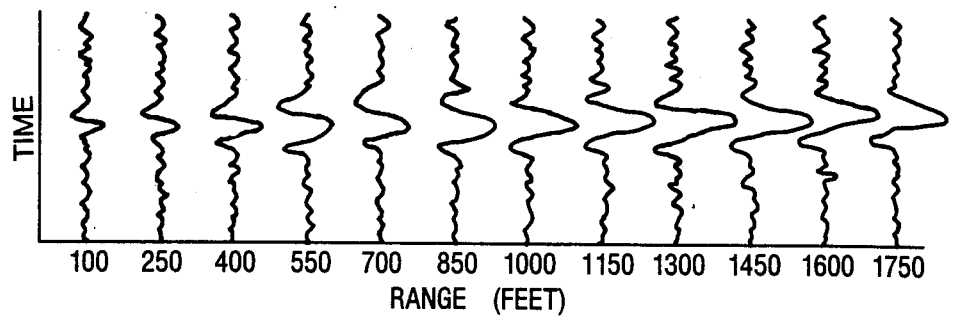
FIG. 3A is a representation of traces in a CDP gather of seismic signals.
Figure 3B:
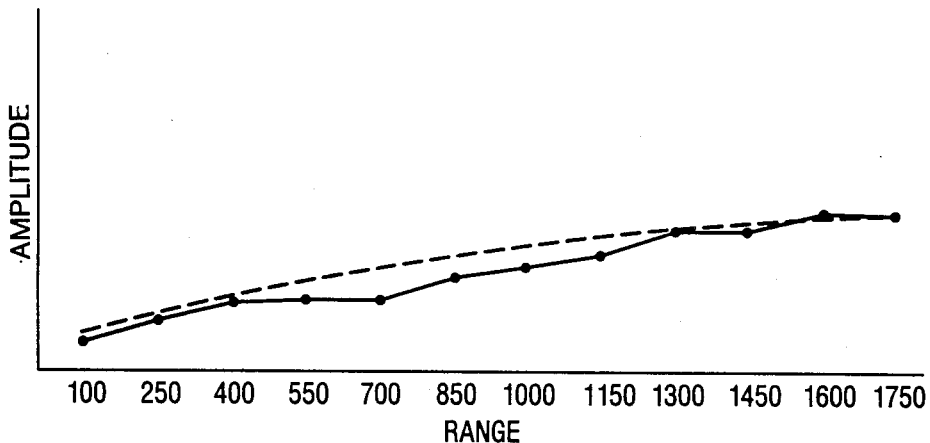
FIG. 3B is a representation of a plot of the measure of the amplitude for a selected time slice of each seismic signal in the CDP gather of seismic signals of FIG. 3A as well as a least squares fit of such data to a function of range.
Figures 3C, 3D:
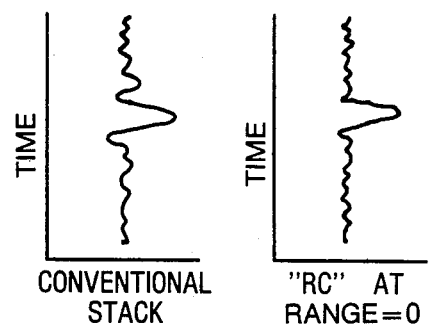
FIG. 3C represents a conventional CDP stack or summation of the traces of the CDP gather of seismic signals of FIG. 3A.
FIG. 3D represents a selectable range trace of the CDP gather of seismic signals from FIG. 3A according to the present invention for a range equal to zero.

Looking now to FIG. 3A, a wiggle trace representation of a CDP gather of seismic signals is provided and a conventional CDP summation of such seismic signals is represented as a single wiggle trace in FIG. 3C. The CDP gathers of seismic signals in FIG. 3A is also illustrative of the occurrence of range dependent amplitude variations in a CDP gather of seismic signals. In fact, this variation of amplitude with range is more truly shown in FIG. 3B, which will be discussed below.

After initial preprocessing of the seismic signals in the CPD gathers, the seismic signals are corrected for normal moveout. For a selected time slice $t_i$, a measure of the amplitudes $A_{ij}$ of the traces of the CDP gather of seismic signals in FIG. 3A are obtained and plotted as dots on a coordinate system of amplitude $A_{ij}$ vs range x as shown in FIG. 3B. It is understood that the amplitude $A_{ij}$ could also have been plotted as a function of incident angle $\theta$. Here it is noted that the choice of range x between initiating seismic source $S_i$ and the detecting seismic receiver $R_j$ or the angle of incidence $\theta$ of the seismic energy wave with the common reflection point is a matter of choice since ray path calculations allow for the transformation from one to the other.

By employing a curve fitting technique, such as least squares, the measures of the seismic signal amplitude $A_{ij}$ of the CDP gather for a selected time slice are fitted to a reflection coefficient function RC resulting in the dashed line in FIG. 3B. By way of example, a reflection coefficient function RC can be obtained using Equation (1). Solutions to Equation (1) and the coefficients a, b, and c can be obtained through regressive analysis. Here X and Y represent a functional relation to the dependent variable incident angle $\theta$ or range x. Many choices of functional relations to the dependent variables can be employed. Exemplary of such choices: $X = TAN^2 \theta$ and $Y = Sin^2 \theta \cdot TAN^2 \theta$, where $\theta$ is the angle of incidence.

The measure of the amplitude $A_{ij}$ for a selected time slice $t_i$ of each seismic signal $T_{ij}$ can now be replaced with a measure of the reflection coefficient RC. Once the entire seismic signal $T_{ij}$ has been so processed, the user can now specify either range x or incident angle $\theta$ and the reflection coefficients RC obtained for the entire length of the seismic signal can be displayed as a wiggle trace shown in FIG. 3D for either a selected range or incident angle. A plurality of such wiggle traces can be employed to obtain a selectable incident angle selectable range seismic section.

By way of example, FIG. 3D is a representation of the reflection coefficient RC for the range x=0, as determined in accordance with the present invention obtained from the seismic signals of FIG. 3A. Adjacent FIG. 3C is a conventional normal incident CDP stacked trace obtained from the seismic signals of FIG. 3A. FIG. 3D demonstrates the reduction in noise levels over FIG. 3C as well as the reduction in the averaging of the amplitude variations in CDP gather of seismic signals resulting from range dependent amplitude variations in the traces of a CDP gather of seismic signals.

Figure 4A:
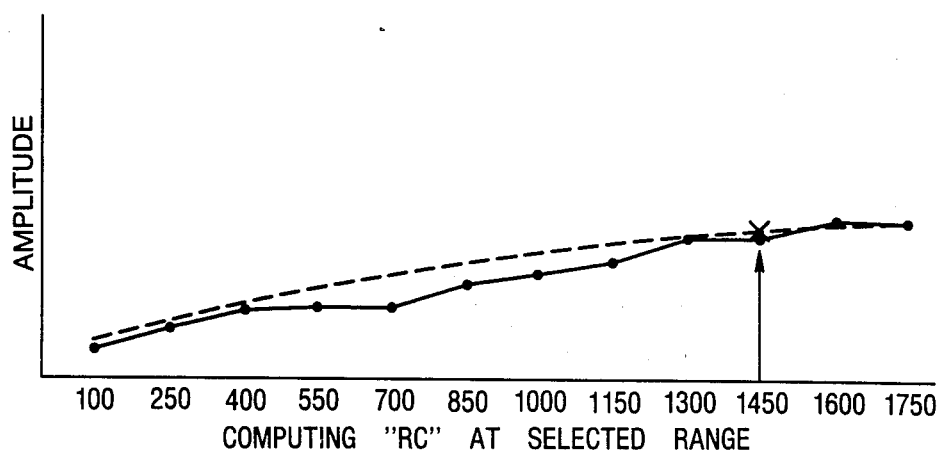
FIG. 4A is a representation of FIG. 3B except that the selected range is set to 1450 ft.
Figures 4B, 4C:
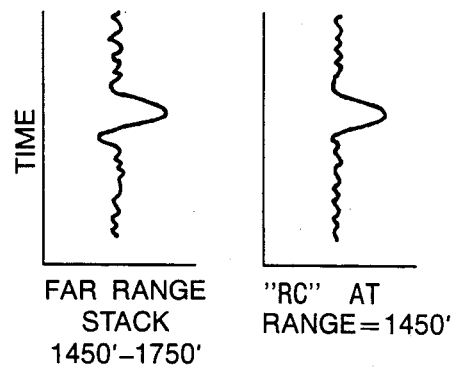
FIG. 4B is a representation of a conventional CDP stack of the far range traces of the CDP gather of seismic signals of FIG. 3A between a range of 1450 and 1750 ft.
FIG. 4C is a selectable range trace of the seismic signal according to the present invention at a range of 1450 ft.

Now looking to FIG. 4, a range of 1450 ft has been selected and a new value of the reflection coefficient function RC can be obtained for all time slices of the CDP gather of seismic signals from FIG. 3A such that a selected incident angle/range trace can be represented in FIG. 4C. For comparison purposes, FIG. 4B represents a conventional far range stacked gather of the CDP seismic signals over a range of 1450-1750 ft from FIG. 3A.

Changes can be made in the combination and a range of features as heretofore set forth in the specification and drawings. It is understood that changes may be made in the embodiment described without departing from the spirit and scope of the invention as defined in the following claims.

What is claimed is:

1. A method for enhancing common depth point seismic data to reduc averaging of lateral variations in earth's subterranean formations comprising the steps of:
    (a) forming CDP gathers of seismic signals preprocessed for normal moveout correction;
    (b) for a selected time slice, measuring the amplitude of each seismic signal in a CDP gather of seismic signals;
    (c) curve fitting the measures of the amplitude of each seismic signal in the first CDP gather of seismic signal to a reflection coefficient function of the incident angle of each seismic signal, in the CDP gather, with a common reflection point in the earth's subterranean formation;
    (d) reducing CDP averaging of lateral variations in the earth's subterranean formations by determining a measure of the reflection coefficient function for a selected incident angle; and
    (e) repeating the recited steps for other selected time slices and other CDP gathers of seismic signals.

2. The method of claim 1 further including the step of displaying the measures of the curve fitted reflection coefficient function for a selected incident angle as a CDP seismic section having increased signal-to-noise ratio.

3. The method of claim 1 wherein the measures of the amplitude are curve fitted to a reflection coefficient function of incident angle according to:

$$RC = a + b \, TAN^2\theta + c \, TAN^2\theta SIN^2\theta$$

where a, b, and c are curve fitting parameters; and $\theta$ is incident angle.

4. A method for processing common depth point seismic data to reduce averaging of lateral variations in the earth's subterranean formations comprising the steps of:
    (a) forming CDP gathers of seismic signals preprocessed for normal moveout correction;
    (b) for a selected time slice, measuring the amplitude of each seismic signal in a CDP gather of seismic signals;
    (c) curve fitting the measures of the amplitude of each seismic signal in the CDP gather of seismic signals to a reflection coefficient function of the range associated with each seismic signal;
    (d) reducing CDP averaging of lateral variations in the earth's subterranean formations be determining a measure of the reflection coefficient function for a selected range; and
    (e) repeating these recited steps for other selected time slices and other CDP gathers of seismic signals.

5. The method of claim 4 further including the step of displaying the measures of the curve fitted reflection coeficient function for a selected range as a seismic section.

* * * * *